United States Patent
Schedgick

(10) Patent No.: US 7,497,452 B2
(45) Date of Patent: Mar. 3, 2009

(54) HYDRO-PNEUMATIC VEHICLE SUSPENSION SYSTEM WITH A DOUBLE ACTING CYLINDER AND ACCUMULATORS

(75) Inventor: David James Schedgick, Menasha, WI (US)

(73) Assignee: Husco International, Inc., Waukesha, WI (US)

( * ) Notice: Subject to any disclaimer, the term of this patent is extended or adjusted under 35 U.S.C. 154(b) by 497 days.

(21) Appl. No.: 11/445,693

(22) Filed: Jun. 2, 2006

(65) Prior Publication Data

US 2007/0278752 A1    Dec. 6, 2007

(51) Int. Cl.
*B60G 15/12* (2006.01)
*B60G 15/00* (2006.01)

(52) U.S. Cl. .................. 280/124.158; 280/124.157; 280/124.159; 280/5.514; 280/5.515; 280/6.159; 280/6.15; 188/313; 188/314; 267/64.25; 267/64.26

(58) Field of Classification Search .......... 280/124.157, 280/124.158, 124.159, 5.514, 5.515, 6.15, 280/6.153, 6.154, 6.155, 6.159; 188/313, 188/314; 267/64.15, 64.25, 64.26
See application file for complete search history.

(56) References Cited

U.S. PATENT DOCUMENTS

| | | | | | |
|---|---|---|---|---|---|
| 2,653,021 | A | * | 9/1953 | Lucien | 267/64.16 |
| 2,902,288 | A | * | 9/1959 | Dill | 280/43.23 |
| 3,479,053 | A | * | 11/1969 | Moulton | 280/104 |
| 3,779,135 | A | * | 12/1973 | Sugimura | 91/45 |
| 3,960,385 | A | * | 6/1976 | Keijzer et al. | 280/6.158 |
| 4,277,076 | A | * | 7/1981 | Hanna | 280/5.508 |
| 4,279,319 | A | | 7/1981 | Joyce, Jr. | |
| 4,639,013 | A | * | 1/1987 | Williams et al. | 280/5.508 |
| 4,887,515 | A | * | 12/1989 | Tabata | 92/80 |
| 4,900,056 | A | * | 2/1990 | Fukushima et al. | 280/5.508 |
| 4,948,163 | A | * | 8/1990 | Kikushima et al. | 280/5.51 |
| 5,009,400 | A | * | 4/1991 | Ott | 267/64.11 |
| 5,024,465 | A | * | 6/1991 | Baiker | 280/6.154 |
| 5,042,781 | A | * | 8/1991 | Ezure et al. | 267/64.23 |
| 5,152,547 | A | * | 10/1992 | Davis | 280/5.512 |
| 5,624,105 | A | * | 4/1997 | Runkel | 267/64.15 |
| 6,092,816 | A | * | 7/2000 | Sekine et al. | 280/6.159 |
| 6,249,728 | B1 | * | 6/2001 | Streiter | 701/37 |
| 6,318,742 | B2 | | 11/2001 | Franzini | |
| 6,390,457 | B1 | * | 5/2002 | Roper | 267/119 |
| 6,394,238 | B1 | | 5/2002 | Rogala | |
| 6,561,325 | B2 | * | 5/2003 | Zebolsky | 188/298 |
| 6,575,484 | B2 | | 6/2003 | Rogala et al. | |

(Continued)

*Primary Examiner*—John Q. Nguyen
*Assistant Examiner*—Barry Gooden, Jr.
(74) *Attorney, Agent, or Firm*—Quarles & Brady LLP; George E. Haas

(57) ABSTRACT

A suspension system dampens motion between two components of a vehicle, such as the wheels and the chassis. An assembly of a cylinder and a piston is connected to both components. The piston defines first and second chambers in the cylinder and has a shaft with an end surface exposed to pressure within a third chamber of the cylinder. A first accumulator is connected to the first chamber by a first accumulator valve and a second accumulator valve connects a second accumulator to the second chamber. A damping valve alternately connects the third chamber to either the second chamber or a fluid tank wherein that connection defines the stiffness of the suspension system and is made in response to force acting on the suspension system. A load leveling circuit also is described.

20 Claims, 2 Drawing Sheets

U.S. PATENT DOCUMENTS

| | | | |
|---|---|---|---|
| 6,834,736 B2 * | 12/2004 | Kramer et al. | 180/89.12 |
| 7,390,002 B2 * | 6/2008 | Kasamatsu | 280/124.159 |
| 7,441,638 B2 * | 10/2008 | Hanawa | 188/314 |
| 7,441,789 B2 * | 10/2008 | Geiger et al. | 280/124.16 |
| 2001/0024005 A1 * | 9/2001 | Sakai | 267/64.28 |
| 2004/0000748 A1 * | 1/2004 | Bell | 267/64.15 |
| 2005/0067239 A1 | 3/2005 | Bauer et al. | |
| 2005/0133321 A1 * | 6/2005 | Fujishima et al. | 188/313 |
| 2005/0199457 A1 * | 9/2005 | Beck | 188/314 |
| 2007/0044654 A1 * | 3/2007 | Schedgick et al. | 92/146 |
| 2007/0045067 A1 * | 3/2007 | Schedgick et al. | 188/266 |
| 2007/0056817 A1 * | 3/2007 | Ward | 188/314 |

* cited by examiner

HYDRO-PNEUMATIC VEHICLE SUSPENSION SYSTEM WITH A DOUBLE ACTING CYLINDER AND ACCUMULATORS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic suspension systems for mitigating transmission of vibrations from one section of a motor vehicle to another section, such as transfer of wheel or axle motion to the vehicle chassis; and more particularly to suspension systems that employ a double acting hydraulic cylinder and an accumulator.

2. Description of the Related Art

A motor vehicle suspension system includes at last one hydraulic suspension cylinder connected between the vehicle chassis and a wheel and/or vehicle axle. Simple suspension systems employ conventional a shock absorber which comprises a sealed cylinder having an internal piston with an orifice that controls flow of fluid between piston and rod chambers on opposite sides of the piston. The constrained rate of fluid flow governs piston movement, thereby damping motion between the chassis and the wheel and/or axle.

More sophisticated suspension systems are adjustable wherein the damping characteristic which can be varied dynamically in response to changes in the load on the vehicle. In one system of this type, a gas-charged accumulator pressurizes at least one of the cylinder chambers which allows resilient displacement of the piston. A valve arrangement selectively connects the piston chamber and rod chamber to a pressure source and a tank of the hydraulic system.

U.S. Pat. No. 6,394,238 describes a suspension system that operates in a regeneration mode, in which a regulated fluid path is provided between the piston and rod chambers. This system includes an accumulator that stores the relatively small amount of fluid corresponding to the difference in volume between the rod and piston chambers, i.e. the portion that the piston rod occupies in the rod chamber. The regeneration mode is particularly useful on vehicles that handle a relatively small range of loads. However, this type of suspension has limited application for large trucks and equipment used in agriculture and construction, because of the wide ranging vehicle loads that will be encountered. In addition, the typical regeneration system cannot actively drive the suspension downward, thereby relying on gravity for this function.

U.S. Pat. No. 6,575,484 describes a suspension system that operates in both a regeneration mode and a double acting mode, in which the cylinder chambers are isolated from each other and fluid flows between them and separate accumulators. The selection between those modes is made in response to the pressure level in the cylinder as measured by a pressure sensor of a closed loop control system. A double-acting cylinder with the rod and piston chambers connected to separate accumulators has been used on vehicles that handle a wide range of loads. However, the accumulators for a double acting system must accommodate the entire volume of the respective cylinder chamber, thus being significantly larger than the accumulator in a regeneration system that merely has to accommodate the volume of the rod within the rod chamber.

Because accumulator size affects the cost and space required, it is desirable to reduce the size of the accumulators in a double-acting suspension system.

SUMMARY OF THE INVENTION

A suspension system is provided to dampen motion between a first member and a second member on a vehicle, for example the system dampens movement between the wheel/axel combination and the vehicle chassis. The system includes a first cylinder assembly connected to the first and second members and comprising a cylinder with a moveable piston therein. The piston defines a first chamber and a second chamber in the cylinder and has a shaft with a surface that is exposed to pressure within a third chamber of the cylinder.

A first accumulator is connected to the first chamber by a first accumulator valve that controls the control flow of fluid there between. A second accumulator valve controls the flow of fluid between the second chamber and a second accumulator. The degree to which the first and second accumulator valves are opened controls the stiffness of the suspension system.

A damping valve has a first position through which fluid flows between the second chamber and the third chamber and a second position which connects the third chamber to a tank that hold the fluid. Selection of the first position and the second position defines stiffness of the suspension system and is made in response to force acting on the suspension system.

Another aspect of the present suspension system is the incorporation of a load leveling circuit connected to a source of pressurized fluid, the tank, and the cylinder assembly to place the piston to a desired position within the cylinder. In one embodiment, the load leveling circuit includes a pair of load leveling valves and a pair of load holding valves. One load leveling valve has a first workport that is alternately connected to the source and the tank and another load leveling valve has a second workport that also is alternately connected to the source and the tank. A first load holding valve connects the first workport to the first chamber and has a state in which fluid is blocked from flowing from the first chamber toward the first workport. A second load holding valve is connected between the second workport and the second chamber and has a state which blocks fluid flow from the second chamber toward the second workport.

DETAILED DESCRIPTION OF THE DRAWINGS

Figure 1:
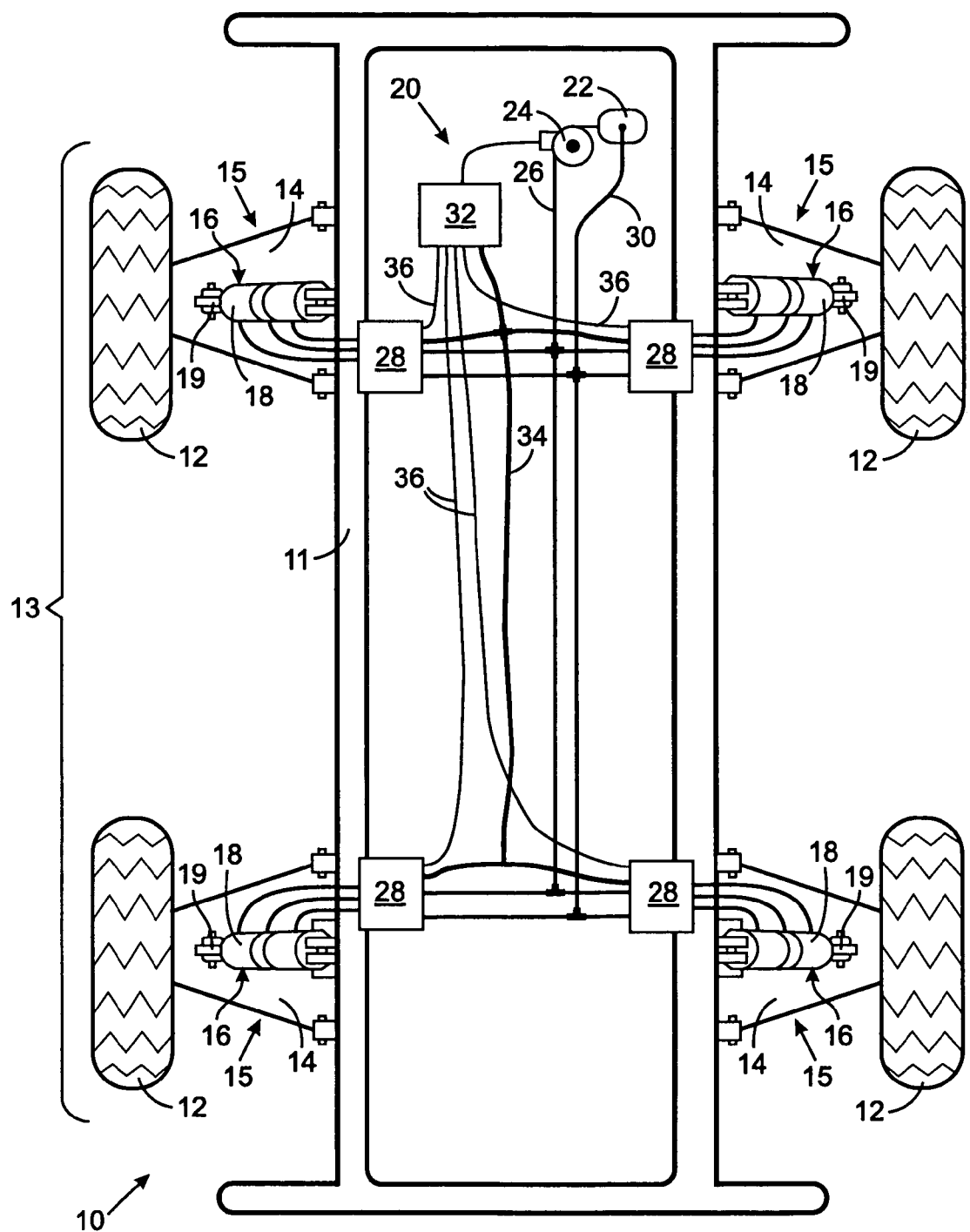
FIG. 1 depicts a vehicle suspension system according to the present invention.

With initial reference to FIG. 1, a vehicle 10 has a chassis 11 supported by the four wheels 12 through suspension system 13 that includes a separate suspension 15 for each wheel. Each suspension 15 includes a parallel wishbone type linkage 14, the construction of which is well known, and a double acting cylinder assembly 16 coupled between the chassis 11 and the linkage 14. Other types of linkages for connecting the vehicle wheels to the chassis may be used. Each cylinder assembly 16 has a cylinder 18, that is pivotally coupled to the chassis 11, and an internal piston with a rod 19 that projects from the cylinder to a pivotal coupling on the adjacent linkage 14. This connection of the cylinder assembly 16 to the respective wheel 12 through the associated linkage 14 causes the piston to reciprocate in the cylinder as the wheel moves in the generally vertical direction relative to the chassis.

The four cylinder assemblies 16 are part of a hydraulic system 20 that comprises a fluid tank 22 and a pump 24 that is driven by the engine of the vehicle 10. The pump 24 draws fluid from the tank 22 and sends it through a supply line 26 to four control valve assemblies 28, each associated with one of the cylinder assemblies 16. Fluid returns from the control valve assemblies 28 through a return line 30 leading to an inlet of the tank 22 in which the fluid is held at substantially atmospheric pressure. Operation of each control valve assembly 28 is governed independently by a system controller 32 that contains a microcomputer, which executes a software program to operate the suspension system. The system controller 32 sends valve control signals and receives data signals a cable 34 that extends to the four control valve assemblies 28. Alternatively, each control valve assembly 28 can have a separate electrical circuit for operating valves therein, with each control circuit exchanging command and data messages over a communication network in place of the cable 34. A conventional hydraulic, load sense line 36 leads from each control valve assembly 28 to the system controller 32 and carries a signal indicating the pressure requirements for operating the associated cylinder assembly 16. The system controller 32 responds to those load sense signals by selecting the one that indicates the greatest pressure and controls the pump 24 to produce the requisite pressure in the supply line 26.

Figure 2:
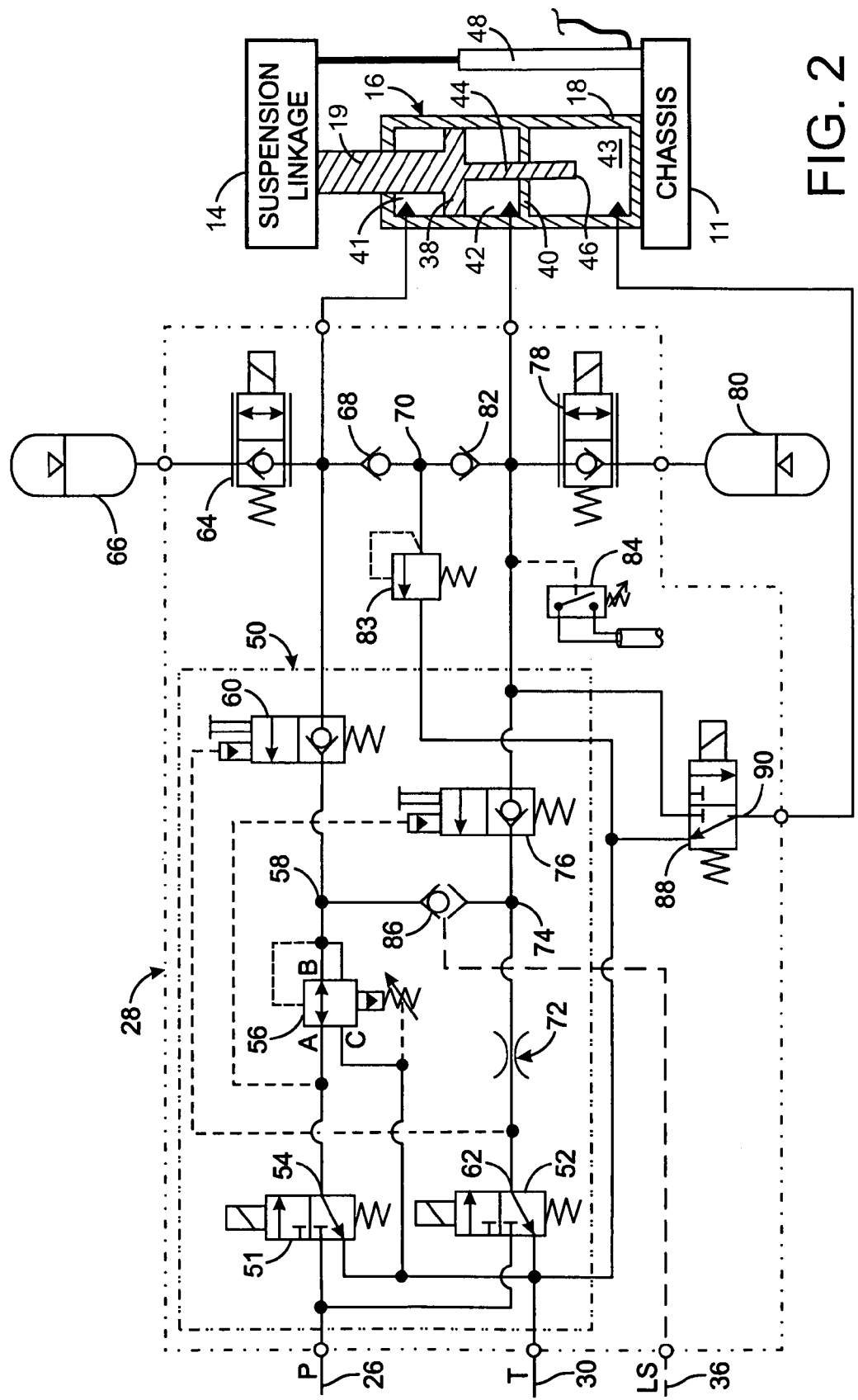
FIG. 2 is a schematic diagram of the hydraulic circuit for one of the cylinders in the suspension system.

With reference to FIG. 2, the cylinder assembly 16 includes a piston 38 that is slidably received within the cylinder 18 and to which the piston rod 19 is attached. Thus, the piston 38 divides the interior of the cylinder 18 into a first chamber 41 and a second chamber 42, commonly referred respectively to as the rod chamber and the piston chamber. The volume of each chamber 41 and 42 varies depending upon the position of the piston 38 within the cylinder, which in turn, is defined by the distance between the chassis 11 and the linkage 14. A shaft 44 extends from the piston 38 through the second chamber 42 and a fixed wall 40 within the cylinder into a third chamber 43 having a fixed size. The shaft 44 has an end 46 the surface of which is exposed within the third chamber 43 and on which pressure within that chamber acts. The distance between the linkage 14 and the chassis 11 is measured by a displacement sensor 48, which provides an electrical signal to the system controller 32 via the cable 34.

The three chambers 41-43 of the cylinder 18 are connected by flexible conduits to the control valve assembly 28 to which the supply line 26, the return line 30, and one of the load sense lines 36 also connect. The supply and return lines 26 and 30 are connected to ports of first and second electrohydraulic, three-way load leveling valves 51 and 52, which are part of a load leveling circuit 50 and each of which has a workport 54 and 62, respectively. The first workport 54 of the first load leveling valve 51 is connected to port A of a pressure reducing/relieving valve 56 that has a port B connected to a first node 58 and a port C connected to the return line 30. The pressure reducing/relieving valve 56 permits fluid flow between ports A and B, until the pressure at port B is greater than the force set by an adjustable spring, at which point the valve shifts to a position that blocks flow between ports A and B while permitting flow from port B to port C and into the return line 30. When the pressure at port B then decreases below the setting of the spring, the pressure reducing/relieving valve 56 returns to the original position. Therefore, the pressure reducing/relieving valve 56 maintains the pressure at port B to a level set by the adjustable spring.

The first node 58 at port B is connected to a first load holding valve 60, which is pilot-operated by pressure at the second workport 54 of the second load leveling valve 52. When pressure at second workport 54 exceeds the spring force of the first load holding valve 60, that valve opens allowing fluid to flow from the first chamber 41 of cylinder 18 to the first load leveling valve 51. Otherwise, the first load holding valve 60 has a position in which an internal check valve permits fluid to flow only from the first load leveling valve 51 to the cylinder's first chamber 41. The first load holding valve 60 couples the first node 58 to the first chamber 41 of cylinder 18 which also is connected by a first accumulator valve 64 to a first accumulator 66. The first accumulator valve 64 is an electrohydraulic proportional valve that is operated in response to a control signal from the system controller 32. When so activated, the first accumulator valve 64 allows bidirectional flow of fluid between the first accumulator 66 and the cylinder's first chamber 41. In the de-energized state, the first accumulator valve 64 has an internal check valve that allows fluid to flow only from the first accumulator 66 toward the first chamber 41, thereby preventing excessive pressure in that accumulator.

Returning to the left side of the control valve assembly 28 in FIG. 2, the second workport 54 of the second load leveling valve 52 is connected by an orifice 72 to a second node 74. Also connected to the second node 74 is a second load holding valve 76, that is pilot-operated by pressure at the first workport 54 of the first load leveling valve 51. When pressure at first workport 54 exceeds the spring force of the second load holding valve 76, that valve opens allowing fluid to flow from the second chamber 42 of cylinder 18 to the second load leveling valve 52. Otherwise, the second load holding valve 76 has a position in which an internal check valve permits fluid to flow only from the second load leveling valve 52 to the second chamber 42. The second chamber 42 of cylinder 18 also is connected by an electrohydraulic, proportional second accumulator valve 78 to a second accumulator 80. The second accumulator valve 78 has a similar configuration to the first accumulator valve 64 and is operated in response to a control signal from the system controller 32.

The first chamber 41 of the cylinder 18 is connected by a first check valve 68 to a pressure relief node 70 and a second check valve 82 couples the second chamber 42 to the pressure relief node. The two check valves are arranged so that the pressure relief node 70 will be at whichever pressure in the two cylinder chambers is the greatest. The pressure relief node 70 is connected by a pressure relief valve 83 to the return line 30. When pressure within the first or the second chamber 41 or 42 (or in one of the accumulators 66 or 80) exceeds the setting of the pressure relief valve 83, that pressure will be relieved to the return line 30. Pressure within the second chamber 42 also activates a pressure switch 84 upon exceeding the threshold setting of that switch, thereby providing an indication of that excessive pressure to the system controller 32 for use as will be described.

The load sense line 36 is connected to the outlet of a conventional shuttle valve 86, which is connected between the first and second nodes 58 and 74, such that the greater pressure between those nodes is applied by the shuttle valve to the load sense line. This provides a load sense signal that indicates the pressure requirement of the control valve assembly 28 which must be met by the outlet pressure from the pump 24. Specifically during load leveling, the load sense signal indicates the greater of the two pressures in the first and second chambers 41 and 42 of the cylinder.

An electrohydraulic, three-way damping valve 88 has a workport 90 connected to the third cylinder chamber 43. In the de-energized state of the damping valve 88, the workport 90 is connected to the return line 30. When the damping valve 88 is energized by a signal from the system controller 32, its workport 90 is connected to the second cylinder chamber 42.

The suspension system 13 senses the relative position of the piston 38 within each cylinder 18 to ensure that under a static load condition the pistons are centered within their range of travel, so as to be able to move substantially equally up and down to provide optimal vibration damping. Considering one of the suspensions 15, the displacement sensor 48, as shown in FIG. 2, furnishes a signal to the system controller 32 indicating the distance between the chassis 11 and the associated suspension linkage 14. The displacement sensor signal indicates the relative position of the piston 38 within the associated cylinder 18, and thus, whether the piston needs to be raised or lowered within the cylinder in order to be centered, a process that is commonly referred to as load leveling.

To lower the piston 38, the first load leveling valve 51 is energized by the system controller 32 to convey pressurized fluid from the supply line 26 to the cylinder's first chamber 41. Specifically, the supply line fluid is conveyed through the first load leveling valve 51 and the pressure reducing/relieving valve 56, which ensures that the pressure at first node 58 does not exceed a predefined level. The pressurized fluid then continues to flow through the load holding valve 60 into the first chamber 41. The supply line pressure appearing at the first workport 54 of the first load leveling valve 51 is communicated to the pilot port of the second load holding valve 76, causing that latter valve to open. This enables fluid from the second chamber 42 to flow through orifice 72 and the de-energized second load leveling valve 52 to the return line 30. This action applies pressurized fluid to the first chamber 41 and drains fluid from the second chamber 42 allowing the piston 38 to move within the cylinder to lower the chassis 11 with respect to the linkage 14. Note that while this is occurring, fluid from the third cylinder chamber 43 is able to flow through the damping valve 88 into the return line 30 to accommodate motion of the shaft 44 attached to the piston 38.

In order to raise the chassis 11 with respect to the suspension linkage 14, both the first and second load leveling valves 51 and 52 are opened to apply pressurized fluid from the supply line 26 to the first and second cylinder chambers 41 and 42. At this time, the relatively high pressure at the workports 54 and 62 of the two load leveling valves 51 and 52 cause both load holding valves 60 and 76 to open. Although equal pressure is applied to both cylinder chambers, because the piston 38 has a larger surface area within the second chamber 42 than in the first chamber 41, a net force is created that drives the piston to extend the rod 19 farther out of the cylinder, thereby raising the chassis with respect to the suspension linkage 14. Any additional fluid required in the third chamber 43, while this motion is occurring, is drawn in from the return line 30 through the damping valve 88. Once leveled, the suspension system 13 is ready to dampen movement between the linkage 14 and the vehicle chassis 11.

During the motion damping function of a particular suspension 15, the first and second load leveling valves 51 and 52 are held closed and the resultant low return line pressure applied to the workports of those valves maintain the first and second load holding valves 60 and 76 in the check valve position. The system controller 32 energizes the first and second accumulator valves 64 and 78 to enable bidirectional fluid flow to and from the respective first or second cylinder chamber 41 or 42. The amount that the accumulator valves are opened determines the damping characteristic of the suspension system 13, as is well known in previous suspension systems.

The three-chamber cylinder 18 and the three-way damping valve 88 enable use of smaller accumulators 66 and 80, than in a conventional two-chamber, double acting cylinder system. When a relatively small load is applied to the chassis 11, the pressure produced in the cylinder's second chamber 42 is below the level that closes the pressure switch 84. The system controller 32 responds to the absence of a signal from the pressure switch 84 by maintaining the damping valve 88 in a de-energized state in which the cylinder's third chamber 43 is coupled to the return line 30. This results in the relatively low return line pressure being applied to the end 46 of the piston shaft 44 that is exposed in the third chamber 43. Therefore, pressure from the second accumulator 80 is applied only to the surface area of the piston 38 that is within the second chamber 42. This reduces the piston side volumetric flow enabling use of a commensurately reduced sized second accumulator 80 and a higher accumulator precharge pressure. As a result, the smaller accumulator volume and higher precharge pressure provides an identical spring rate as was accomplished in previous suspension systems that employed a two-chamber cylinder with a larger accumulator with a lower precharge pressure.

As the load on the chassis 11 and thus the cylinder assembly 16 increases, the suspension system 13 begins to stiffen thereby providing a harsher vehicle ride. This effect is alleviated by the third cylinder chamber 43 and the damping valve 88. When the load exceeds a given magnitude, the pressure within the second chamber 42 of the cylinder 18 goes above the threshold at which the pressure switch 84 closes. The switch closure sends an electrical signal indicative of this event to the system controller 32, which responds by energizing the damping valve 88. The damping valve 88 moves into a position in which the cylinder's second and third chambers 42 and 43 are hydraulically connected to the second accumulator 80 and a larger equivalent piston side area is now exposed to the accumulator pressure. That is, the piston surface area in the second chamber 42 and the surface area at the end 46 of the shaft 44 are exposed to the same pressure level, thereby effectively providing a larger piston area to carry the increased load. As a consequence, the static pressure in the second accumulator 80 is lowered, which reduces the spring rate of the suspension system. Note that accumulators provide stiffer spring rate at higher pressure levels because the volume occupied by the gas charge is decreased and there is not as much room remaining to compress the gas.

The three-chambered cylinder 18 and the three-way damping valve 88 cooperate to maintain a lower system pressure, which reduces the volume requirements of the accumulators, especially the second accumulator 80. This functionality not only improves suspension system performance, but also reduces cost and the space required.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A suspension system for damping motion of a first member with respect to a second member on a vehicle, said suspension system comprising:
   a tank for holding a fluid;
   a cylinder assembly connected to the first member and the second member and comprising a cylinder, in which a piston defines a first chamber and a second chamber, and a shaft connected to the piston and having a surface exposed to pressure within a third chamber of the cylinder;
   a first accumulator and a second accumulator;
   a first accumulator valve controlling flow of fluid between the first chamber and the first accumulator;
   a second accumulator valve controlling flow of fluid between the second chamber and the second accumulator; and
   a damping valve having a first position which connects the second chamber to the third chamber and a second position which connects the third chamber to the tank, wherein selection of the first position and the second position changes stiffness of the suspension system and is made in response to force acting on the suspension system.

2. The suspension system as recited in claim 1 wherein the piston has a smaller first surface area in the first chamber than a second surface area in the second chamber.

3. The suspension system as recited in claim 1 wherein the first accumulator valve and the second accumulator valve are electrohydraulic proportional valves.

4. The suspension system as recited in claim 1 further comprising a load leveling circuit that adjusts the position of the piston in the cylinder under a static condition.

5. The suspension system as recited in claim 1 further comprising:
   a source of pressurized hydraulic fluid;
   a first load leveling alternately connecting a first workport to the source and the tank;
   a second load leveling valve alternately connecting a second workport to the source and the tank;
   a first load holding valve connecting the first workport to the first chamber and having a state in which fluid is blocked from flowing from the first chamber toward the first workport; and
   a second load holding valve connecting the second workport to the second chamber and having a state in which fluid is blocked from flowing from the second chamber toward the second workport.

6. The suspension system as recited in claim 5 wherein:
   the first load holding valve is pilot operated by pressure at the second workport; and
   the second load holding is pilot operated by pressure at the first workport.

7. The suspension system as recited in claim 5 further comprising a pressure reducing/relieving valve connected between the first workport and the first load holding valve and preventing pressure at the first load holding valve from exceeding a predefined level.

8. The suspension system as recited in claim 5 further comprising an orifice connected between the second workport and the second load holding valve.

9. The suspension system as recited in claim 1 further comprising a device that produces a signal when pressure in the second chamber exceeds a predefined level.

10. The suspension system as recited in claim 1 further comprising a load sense circuit that provides a signal indicating a greater of pressures in the first and second chambers.

11. The suspension system as recited in claim 1 further comprising pressure relief arrangement that prevents pressure in the first and second chambers from exceeding a predetermined level.

12. An suspension system for damping motion between a first member and a second member on a vehicle, said suspension system comprising:
   a source of pressurized hydraulic fluid;
   a tank connected to furnish fluid to the source;
   a cylinder assembly connected to the first member and the second member and comprising a cylinder and a piston that defines a first chamber and a second chamber in the cylinder, and a shaft connected to the piston and having an end exposed to pressure within a third chamber of the cylinder;
   a first accumulator and a second accumulator;
   a first accumulator valve controlling flow of fluid between the first chamber and the first accumulator;
   a second accumulator valve controlling flow of fluid between the second chamber and the second accumulator;
   a damping valve having a first position in which the third chamber is connected to the second chamber and a second position in which the third chamber is connected to the tank, wherein selection of the first position and the second position is in response to force acting on the suspension system; and
   a load leveling circuit connected to the source, the tank and the cylinder assembly to move the piston to a desired position within the cylinder.

13. The suspension system as recited in claim 12 wherein the piston has a smaller first surface area in the first chamber than a second surface area in the second chamber.

14. The suspension system as recited in claim 12 wherein the load leveling circuit comprises:
   a first load leveling valve having a first workport that is alternately connected to the source and the tank;
   a second load leveling valve having a second workport that is alternately connected to the source and the tank;
   a first load holding valve connecting the first workport to the first chamber and having a state in which fluid is blocked from flowing from the first chamber toward the first workport; and
   a second load holding valve connecting the second workport to the second chamber and having a state in which fluid is blocked from flowing from the second chamber toward the second workport.

15. The suspension system as recited in claim 14 wherein:
   the first load holding valve is pilot operated by pressure at the second workport; and
   the second load holding is pilot operated by pressure at the first workport.

16. The suspension system as recited in claim 14 further comprising a pressure reducing/relieving valve connected between the first workport and the first load holding valve and preventing pressure at the first load holding valve from exceeding a predefined level.

17. The suspension system as recited in claim 14 further comprising an orifice connected between the second workport and the second load holding valve.

18. The suspension system as recited in claim 14 further comprising a load sense circuit that provides a signal indicating a greater of one of pressures at the first and load holding valves.

19. The suspension system as recited in claim 12 further comprising a device that produces a signal when pressure in the second chamber exceeds a predefined level, and wherein selection of the first position and the second position of the damping valve is in response to the signal.

20. The suspension system as recited in claim 12 further comprising:
   a first check valve that communicates pressure in the first chamber to a pressure relief node;
   a second check valve that communicates pressure in the first chamber to the pressure relief node; and
   a pressure relief valve that connects the pressure relief node to the tank when pressure at the pressure relief node exceeds a predetermined level.

* * * * *